(12) United States Patent
Hu (10) Patent No.: US 8,650,194 B2
(45) Date of Patent: Feb. 11, 2014

(54) TASK-BASED TAGGING AND CLASSIFICATION OF ENTERPRISE RESOURCES

(75) Inventor: Bo Hu, Huntingdom (GB)

(73) Assignee: SAP AG, Walldorf (DE)

(*) Notice: Subject to any disclaimer, the term of this patent is extended or adjusted under 35 U.S.C. 154(b) by 0 days.

(21) Appl. No.: 12/965,541

(22) Filed: Dec. 10, 2010

(65) Prior Publication Data

US 2012/0150859 A1 Jun. 14, 2012

(51) Int. Cl.
*G06F 17/30* (2006.01)

(52) U.S. Cl.
USPC .......................................... 707/737; 715/708

(58) Field of Classification Search
USPC ........ 707/737, 738, 778, 4, 10, 776; 715/854, 715/738, 708
See application file for complete search history.

(56) References Cited

U.S. PATENT DOCUMENTS

| | | | | |
|---|---|---|---|---|
| 8,099,429 | B2 * | 1/2012 | Deyo et al. | 707/776 |
| 8,275,666 | B2 * | 9/2012 | Chang et al. | 705/26.1 |
| 2003/0105657 | A1 * | 6/2003 | Nandigama et al. | 705/9 |
| 2006/0259475 | A1 * | 11/2006 | Dehlinger | 707/3 |
| 2006/0265267 | A1 * | 11/2006 | Chen et al. | 705/9 |
| 2008/0177723 | A1 * | 7/2008 | Abe et al. | 707/4 |
| 2008/0282198 | A1 * | 11/2008 | Brooks et al. | 715/854 |
| 2009/0235167 | A1 * | 9/2009 | Boyer et al. | 715/708 |
| 2009/0276437 | A1 * | 11/2009 | Weinstein et al. | 707/10 |
| 2010/0332478 | A1 * | 12/2010 | Duman et al. | 707/738 |
| 2011/0016150 | A1 * | 1/2011 | Engstrom et al. | 707/778 |
| 2011/0029533 | A1 * | 2/2011 | Jayakody et al. | 707/738 |
| 2011/0082825 | A1 * | 4/2011 | Sathish et al. | 706/46 |
| 2012/0072845 | A1 * | 3/2012 | John et al. | 715/738 |

OTHER PUBLICATIONS

Simone Braun, Christine Kunzmann, Andreas Schmidt, "People Tagging & Ontology Maturing: Towards Collaborative Competence Management." In David Randall and Pascal Salembier, editors, from CSCW to Web2.0: European Developments in Collaborative Design Selected Papers from COOP08, Computer Supported Cooperative Work. Springer, Berlin/Heidelberg, 2010.

Richard Crowder, Gareth Hughes and Wendy Hall, "Approaches to Locating Expertise Using Corporate Knowledge." International Journal of Intelligent Systems in Accounting, Finance, and Management, 11(4):185-200, 2002.

David Hawking, "Challenges in Enterprise Search." In ADC '04: Proceedings of the 15th Australasian database conference, pp. 15-24. Australian Computer Society, Inc., 2004.

Anil K. Jain, Richard C. Dubes, "Algorithms for Clustering Data." Prentice-Hall, Inc., Upper Saddle River, NJ, USA, 1988.

(Continued)

*Primary Examiner* — James Trujillo
*Assistant Examiner* — Thong Vu
(74) *Attorney, Agent, or Firm* — Fountainhead Law Group PC (57) ABSTRACT

Embodiments of the present invention relate to systems and methods for task-based tagging and resource classification, which allow tags or metadata to emerge from execution of work-related tasks and activities. In certain embodiments, tags can be automatically extracted from activities performed, for example utilizing a textual description of tasks carried out by an employee. Accumulated tags can then be utilized to describe enterprise resources. Automatic tagging or metadata annotation can be integrated with everyday work utilizing one or more techniques. Candidate tags can be extracted from a task written description utilizing an algorithm that analyzes keywords. Candidate tags can be refined, for example by clustering utilizing a K-means approach. Candidate tags can be ranked based on an overall frequency adjusted against time, with the importance of a tag declining with time.

20 Claims, 7 Drawing Sheets

(56) References Cited

OTHER PUBLICATIONS

Ajita John and Dorée Seligmann, "Collaborative Tagging and Expertise in the Enterprise." In Proceedings of Collaborative Web Tagging Workshop held in Conjunction with WWW 2006, May 2006.

Yutaka Matsuo and Mitsuru Ishizuka, "Keyword Extraction from a Single Document using Word Co-occurrence Statistical Information." International Journal on Artificial Intelligence Tools, 13:2004, 2003.

Mark Maybury, Ray D'Amore, and David House, "Expert Finding for Collaborative Virtual Environments." Communications of the ACM, 44(12):55-56, 2001.

Andrew P. McAfee, "Enterprise 2.0: The Dawn of Emergent Collaboration." MIT Sloan Management Review, 47(3):21-28, 2006.

Uwe V. Riss, Alan Rickayzen, Heiko Maus, Wil M.P. van der Aalst, "Challenges for Business Process and Task Management." Journal of Universal Knowledge Management, Special Issue on Knowledge Infrastructures for the Support of Knowledge Intensive Business Processes, pp. 77-100, 2005.

Todd E. Scheetz, Nishank Trivedi, Kevin T. Perdretti, Terry A. Braun, Thomas L. Casavant, "Gene Transcript Clustering: A Comparison of Parallel Approaches." Future Generations Computer Systems 21(5):731-735, 2005.

Michael Steinbach, George Karypis, and Vipin Kumar, "A Comparison of Document Clustering Techniques." Technical Report, 2000.

Jason Tsong-Li Wang, Kaizhong Zhang, Karpjoo Jeong, and Dennis Shasha, "A System for Approximate Tree Matching." IEEE Transactions on Knowledge Data Engineering, 6(4):559-571, 1994.

Kasimir—Pattern-based task management. MATURE Consortium 2009. http://mature-ip.eu/result/design-study/pattern-based-task-management.

Tobias Ley, Dietrich Albert, and Stefanie Lindstaedt, "Competency Management using the Competence Performance Approach: Modeling, Assessment, Validation, and Use." In Miguel-Angel Sicilia, editor, Coompetencies in Organizational E-Learning, pp. 83-119. Information Science Publishing, Hershey, PA, USA, 2006.

Lars Ahrenberg, "Term Extraction: A Review (Draft Version 091221)." available at http://www.hutchinsweb.me.uk/compendium.htm.

L. Lovàsz and M. Plummer, "Matching Theory." Chapter 5, pp. 143-212. North-Holland, Amsterdam, 1986.

\* cited by examiner

TASK-BASED TAGGING AND CLASSIFICATION OF ENTERPRISE RESOURCES

BACKGROUND

The present invention relates to computing, and in particular, to a systems and methods for a computer implemented scheme for task-based tagging and resource classification.

Unless otherwise indicated herein, the approaches described in this section are not prior art to the claims in this application and are not admitted to be prior art by inclusion in this section.

With the deepening of globalization—more and more non-mission-critical businesses are outsourced away from the home countries. For example, example design teams may be located in Europe, manufacturers located in China and service support located in India.

Thus it becomes increasingly important to establish the right teams of specialties for consultation, coordination, and collaboration. This can be based on a thorough understanding of corporate human resource.

Competency management is considered an important measure for effectively managing enterprise knowledge and human resources by way of resource allocation, employee further development, etc. Effective competency management helps to establish and maintain organizational knowledge.

This is of particular importance in the current global economy climate, as having a solid understanding of what a company currently processes and what knowledge is still missing and yet to be acquired, can help the company to better compete with others in the rapidly changing market.

The benefit is evident in two aspects. On the one hand, accurate and precise self-evaluation leads to accurate market self-positioning, which in turn facilitate business agility. When the market changes, a company can quickly gather what it has and respond accordingly. Self-evaluation is inevitably grounded on pooling individual expertise into the organizational competence directory.

On the other hand, organizations are currently facing the challenge of people fluctuation (i.e. changing jobs become more common in the new working population), as compared with earlier eras. Apart from the direct cost (recruitment and training) of replacing those who leave the organization, a more significant yet invisible cost is that more than often the knowledge of individual employees vanishes when people leave the organization.

Organizations can take countermeasures to minimize the damage caused by such people fluctuation. Effective competency management can help reduce the chance of having individual employees as the critical path of too many mission-critical business tasks.

Effectively managing enterprise resources has been approached from different directions. One approach is the Enterprise 2.0 paradigm described by Andrew P. McAfee in "Enterprise 2.0: The dawn of emergent collaboration", MIT Sloan Management Review, 47(3):21-28 (2006), which is incorporated by reference herein for all purposes. However, metadata of enterprise (information) resources is not always aligned with a company's core business and the everyday working environment of the employees.

Recently, tagging has also started to be applied in corporate applications, including the area of competency management. Unlike general social network web sites, the enterprise tagging approach, like many other Enterprise applications, suffers from a lack of motivation in the working environment. Sharing knowledge with follow colleagues is not always highly appreciated and mutually beneficial especially when the corporate culture does not practically reward such sharing.

Those individuals performing the tagging have to invest a significant amount of labor and time without obvious immediate benefits. It disturbs the normal work routine and becomes less welcoming over the time. The fear of losing power aggravates the situation.

Tagging colleagues as experts on certain topics does not necessarily result in a reciprocal merit action from the recommended due to one reason or another. This is also the underlying reason when tagging in enterprise environment works well in small scale pilot studies where encouragement and requirement are endorsed by the management, but fail to show long-term benefit when deployed in practice.

The present disclosure addresses these and other issues with systems and methods for a computer implemented task-based scheme for tagging and resource classification.

SUMMARY

Embodiments of the present invention relate to systems and methods for task-based tagging and resource classification, which allow tags or metadata to emerge from execution of work-related tasks and activities. In certain embodiments, tags can be automatically extracted from activities performed, for example based upon a textual description of tasks carried out by an employee. Accumulated tags can then be utilized to describe enterprise resources. Automatic tagging or metadata annotation can be integrated with everyday work utilizing one or more techniques. Tags can be extracted from a task written description utilizing an algorithm that identifies keywords. Tags can be refined, for example by clustering utilizing a K-means approach. Tags can be ranked based on an overall frequency adjusted against time, with the importance of a tag declining with time.

An embodiment of a computer-implemented method according to the present invention comprises, receiving a written description linked to a job task, extracting tags from the written description by text analysis and term extraction, refining the tags by clustering, describing an enterprise resource using the tags, assessing a relevance of the tags based upon a date of task execution, storing the tags associated with the enterprise resource, and managing the enterprise resource in a manner aligned with work activities.

In certain embodiments the written description refers to the enterprise resource.

In certain embodiments the method further comprises storing the tags associated with the job task.

In certain embodiments the enterprise resource comprises a human being.

In certain embodiments the enterprise resource comprises a non-human resource.

In certain embodiments the method further comprises pre-processing the written description with natural language processing methods prior to the extracting.

In certain embodiments the written description is linked to the job task through task patterning.

An embodiment of a non-transitory computer readable storage medium according to the present invention embodies a computer program for performing a method, said method comprising, receiving a written description linked to a job task, extracting tags from the written description by text analysis and term extraction, refining the tags by clustering, describing an enterprise resource using the tags, assessing a relevance of the tags based upon a date of task execution, and storing the tags associated with the enterprise resource.

In certain embodiments the written description refers to the enterprise resource.

In certain embodiments the method further comprises storing the tags associated with the job task.

In certain embodiments the enterprise resource comprises a human being.

In certain embodiments the enterprise resource comprises a non-human resource.

In certain embodiments the method further comprises pre-processing the written description with natural language processing methods prior to the extracting.

An embodiment of a computer system according to the present invention comprises one or more processors and a software program executable on said computer system, the software program configured to, receive a written description linked to a job task, extract tags from the written description by text analysis and term extraction, refine the tags by clustering, describe an enterprise resource using the tags, assess a relevance of the tags based upon a date of task execution, and store the tags associated with the enterprise resource.

In certain embodiments the written description refers to the enterprise resource.

In certain embodiments the method further comprises storing the tags associated with the job task.

In certain embodiments the enterprise resource comprises a human being.

In certain embodiments the enterprise resource comprises a non-human resource.

In certain embodiments the method further comprises pre-processing the written description with natural language processing methods prior to the extracting.

In certain embodiments the written description is linked to the job task through task patterning.

The following detailed description and accompanying drawings provide a better understanding of the nature and advantages of the present invention.

DETAILED DESCRIPTION

Described herein are techniques for providing a computer-implemented task-based tagging and resource classification scheme.

The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, examples and specific details are set forth in order to provide a thorough understanding of various embodiments of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
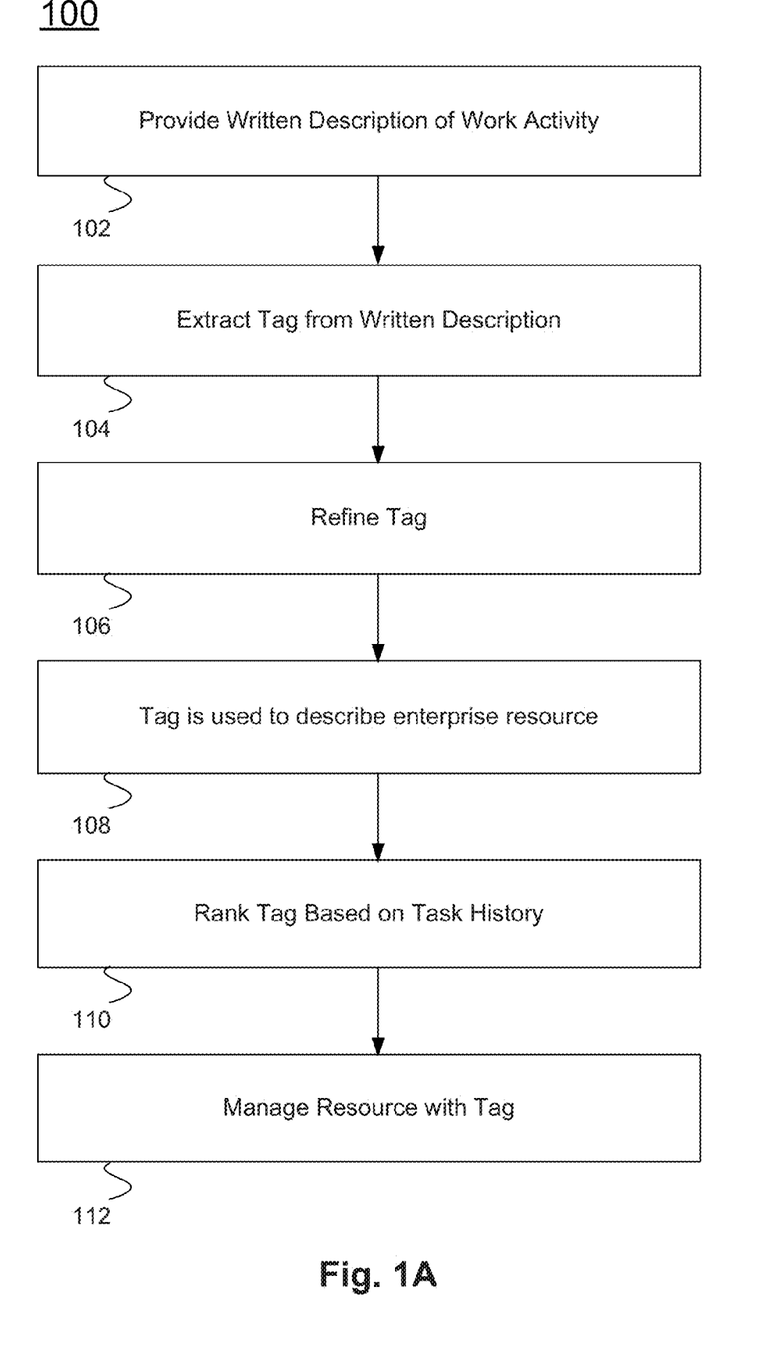
FIG. 1A shows a simplified flow chart of a method according to one embodiment of the present invention.
Figure 1B:
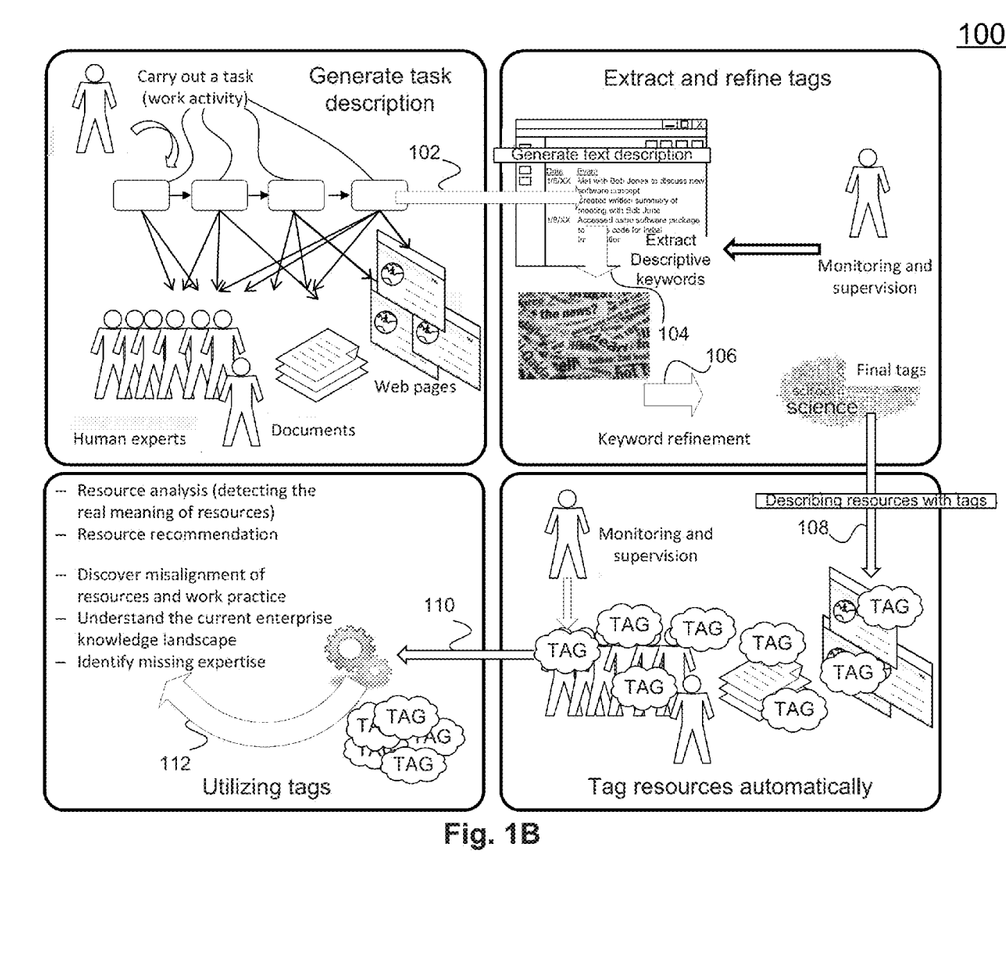
FIG. 1B presents a graphic view of the process flow of FIG. 1A.

One way of overcoming motivational dilemmas associated with tagging, is through combining automatic tagging with the work task execution. FIG. 1A shows a simplified flowchart showing steps according to one embodiment of a method 100 according to the present invention. FIG. 1B shows this process flow in a more graphic form.

In a first step 102, a textual description of a work activity is provided. This written description is linked in some way to a specific task. In certain embodiments, this textual description may be formally created as part of standard job procedures, and may include pre-determined portions such as a task title, a subtitle, a summary, and task body including references, descriptions of problems/solutions, and discussion threads. Examples of such written descriptions may include but are not limited to work logs (such as time-entry logs), task tickets (such as technology support tickets), calendars, to-do lists, and expense reports.

Alternatively or in combination with the creation of a formal written document, the textual description may be created as a part of performing the task itself. Examples of such written descriptions may include but are not limited to, emails, text messages, transcribed voicemails, meeting minutes, and documents specifically generated in furtherance of the task (such as memoranda, presentation slides, and other types of deliverables).

According to certain embodiments, the text description may also be created based upon utilization of certain resources of the enterprise. In certain embodiments, these resources may be human or non-human in nature. As used herein, the term "artifact" refers generally to a resource of the enterprise that is non-human in nature, for example a software program, a document, a website, a policy, or a procedure. Examples of written descriptions arising out of reliance upon enterprise resources may include but are not limited to, browser logs, phone logs, discussion forums, software application use (check-out) histories, and document preparation template access histories.

According to certain embodiments, the creation of a written description that is linked to a task, can be facilitated utilizing a task patterning approach. This is described below in connection with FIG. 2.

In a second step 104, a tag is automatically extracted from the textual description. Certain embodiments may perform this tag extraction through analysis of keywords present in the written description. An example of such an algorithm to perform tag extraction based upon keyword extraction, is described below and in conjunction with FIG. 3.

In a third step 106, tags are refined for relevance based upon one or more approaches. According to certain embodiments, the relevance of a tag may be compared with other tags based upon clustering techniques, for example k-means clustering. By refinement in such manner, the size of tag corpus can be reduced/consolidated into a set of final tags.

As shown in a fourth step 108, the tags that have been created are used to describe resources of the enterprise. Examples of resources include human expertise, as well as non-human resources present in the infrastructure of the enterprise.

As shown in a fifth step 110, tags used to annotate an enterprise resource can be ranked according to their relevance. In certain embodiments, such tag ranking can be based upon task history (with more frequently used tags assigned a higher ranking than those less frequently used ones), and can be based upon time (with more recent tags assigned a higher ranking than older tags based upon their continuing relevance).

In a sixth step 112, various resources (both human and non-human) of the enterprise, can be effectively managed utilizing the tags. As discussed further below, one exemplary use for such tags in the enterprise environment is for resource analysis; that is, detecting the real meaning of resources.

Another possible use for the tags is in recommending resources, for example locating human experts on particular subjects within an organization. Conversely, analysis of the tags can also be used to identify areas of expertise that are lacking within the enterprise.

Still another potential use for tags is in understanding the current enterprise knowledge landscape. This allows identification of particular resources that are available within an organization and help in enterprise competency management.

Yet another example of a possible use for tags, is to discover misalignment of resources and current work practices. This can be done by analyzing patterns in the association of work behavior with particular enterprise resources as described by tags.

As mentioned above, certain embodiments may rely at least in part upon extraction of tags from written descriptions linked to specific tasks through the concept of task patterning. U. V. Riss, A. Rickayzen, H. Maus, and W. M. P. van der Aalst, "Challenges for business process and task management", Journal of Universal Knowledge Management, Special Issue on Knowledge Infrastructures for the Support of Knowledge Intensive Business Processes, pages 77-100 (2005), is incorporated by reference herein for all purposes.

In this document, the task pattern approach was suggested as a low cost way to capture process knowledge in knowledge-intensive work. This approach involved the dissection of process models on the level of individual tasks, and their use to record and abstract activities necessary to fulfill the tasks. By doing so, the sharing of process knowledge becomes well focused and grounded as sharable and reusable patterns of tasks.

With a task pattern, task execution can be faithfully recorded together with human and physical resources used during the execution of tasks. This association between work tasks and enterprise resources offers a solid ground for the task-centric enterprise resource tagging according to embodiments of the present invention.

Embodiments of tagging schemes according to the present invention can be applied to virtually any resources referred to in task execution. These include individuals, departments, policies, documents, and others. However, the following discussion focuses mainly upon how such a task-based tagging scheme can facilitate competency management. Similarly, embodiments of the present invention can achieve management of other types of resources.

Approaches and goals for competency management are described by Tobias Ley, Dietrich Albert, and Stefanie Lindstaedt in "Competency management using the competence performance approach: Modeling, assessment, validation, and use", Competencies in Organizational E-Learning, Miguel-Angel Sicilia, Ed., pp. 83-119. Information Science Publishing, Hershey, Pa. (2006), which is incorporated by reference in its entirety herein. These arguments in favor of competency management include: i) support strategy planning and align the core business with the strategies, ii) increase the awareness of competency across different units within an organization, and iii) further development of both individuals and teams/departments.

Competency management is traditionally performed through self-assessment by the employees. Sometimes, this is enhanced with guidance and/or supervision from the management. For instance, employees may be required to label themselves with keywords drawn from a predefined vocabulary.

The corpora from which labels may be chosen, may be manually crafted with the help of domain specialists, and repetitively updated to reflect the core business and strategies of organizations. Such a guided self-assessment, though assuring alignment between individual and organizational perspectives, might fail due to the inaccuracy resulted from deliberate exaggeration and understatement and/or intentional or unintentional misinterpretation of the vocabulary.

In order to minimize the influence of such "self" factors in specialist profiling, people tagging was proposed by Simone Braun, Christine Kunzmann, and Andreas Schmidt in "People tagging & onto-logy maturing: Towards collaborative competence management", CSCW to Web2.0: European Developments in Collaborative Design Selected Papers from COOP08, Computer Supported Cooperative Work, David Randall and Pascal Salembier, Eds, Springer, Berlin/Heidelberg (2010), which is incorporated by reference for all purposes.

A concept underlying such people tagging is to combine tagging and semantic web technologies in peer assessment. That is, employees tag each other according to domain ontologies.

Although in pilot studies people tagging has shown interesting results, it does not provide answers to the inherent weakness of manual labeling and tagging approaches: lack of fairness and low maintainability. For example individuals may over- or under-assess others, due to peer-pressure or conflict of interests. Meanwhile, maintaining a large number of tags is time and labor-intensive, while the immediate value of tagging is not clearly evident.

Automatic extraction of an individual's competency profile, is a valid alternative. A number of efforts have been directed to this approach. For example in the academic environment, publications have been used to elicit expertise of the authors, as described by R. Crowder, G. Hughes, and W. Hall in "Approaches to locating expertise using corporate knowledge", International Journal of Intelligent Systems in Accounting, Finance, and Management, 11(4):185-200 (2002), which is incorporated by reference in its entirety for all purposes.

In a collaborative workspace, expertise can be extracted from the materials contributed from individuals. This is described by Mark Maybury, Ray D'Amore, and David House in "Expert finding for collaborative virtual environments", CommunACM, 44(12):55-56 (2001), which is incorporated by reference in its entirety for all purposes.

In the aforementioned approaches (manual and automated), profiling is still largely decoupled from an individual's work context. Even though automatic methods are less subjective, isolation from actual work activities (which might be due to too coarse or too fine of the granularity levels) jeopardizes the usefulness of the resultant competency profiles. Accordingly, a mapping tool is helpful to identify the correspondences among different granularity levels.

Furthermore, co-authorship of publications and other documents does not necessarily reflect who has contributed to what part of those artifacts. In certain circumstances, article co-authors may be named based upon considerations other than specific contributions.

A similar gap may be present in the tagging and management of other enterprise resources, for example where an apparatus inspecting the resources does not align them with the work activities where the resources are consumed. Inaccuracy may result from management tools relying on the erroneous metadata.

In a real-world environment, expertise is essentially boosted through continuous practice, while certain skills die out without a practical demand for them. An employee's competency can therefore be profiled by faithfully capturing everyday work activities of the employee, as is achieved by embodiments according to the present invention.

Certain embodiments may leverage the concept of the task pattern as a data source. Tagging can be combined with work activities as described in the Example. Possible technologies to facilitate task-based tagging are also described. Tagging schemes according to embodiments of the present invention may give rise to more effective management of human resources and artifacts of the enterprise.

The concepts of tasks, task patterns, and processes are described as follows. A process is a collection of structured activities (tasks) with a precise goal to be achieved over a period of time. The activities (tasks) of a process are partially ordered and can be further divided into finer-grained subtasks.

A task is an action requiring completion. A task pattern is an abstraction of tasks replacing specific resources with abstractors. Task patterns can be instantiated by assigning concrete instances to a task resource abstractor as the abstraction of artifacts and human resource associated with tasks. This is described by Riss et al. as cited above.

The task pattern approach is bottom-up, in that it involves users in the creation and sharing of process (and process related knowledge), without necessarily implicating them in actual business process management activities. This is done through task-based experience reuse or task abstraction, transferring users' experience (acquired after successfully accomplishing certain tasks), into manageable and operable formulae.

At least two options exist for realizing a task abstraction operation. First, entire task structures and details can be duplicated, with the assumption that everything is implicitly relevant to the next task in a similar context. Second, users are given the responsibility of explicitly selecting every detail to be documented.

In practice, the former is likely to be useful only for a small set of tasks. This is because when task number increases, so does information to be considered. Information overload leads to a situation that users spend potentially more effort customizing the duplicated task than to start a new one.

The latter option could also overwhelm users as it requires them to consider too many details, some of which might not be reusable. Users might also misjudge the significance of certain information making the recorded experience incomplete.

Accordingly, a more helpful position is to consider the reuse of past experience lies somewhere in between these two extremes. To that end, the concept of task pattern was proposed as the basis upon which previous experience can be shared.

Task patterns are the records of previous task activities and information artifacts. Task patterns are harvested by monitoring the interaction between users and a task management system. This allows collecting valuable information of events during task execution, and generalizing the information into resource abstractors.

The task history actually provides an explicit view on how the task is completed with critical information artifacts attached to it. The transition between task and task pattern is supported in a task pattern management system, as shown in FIG. 2.

Figure 2:
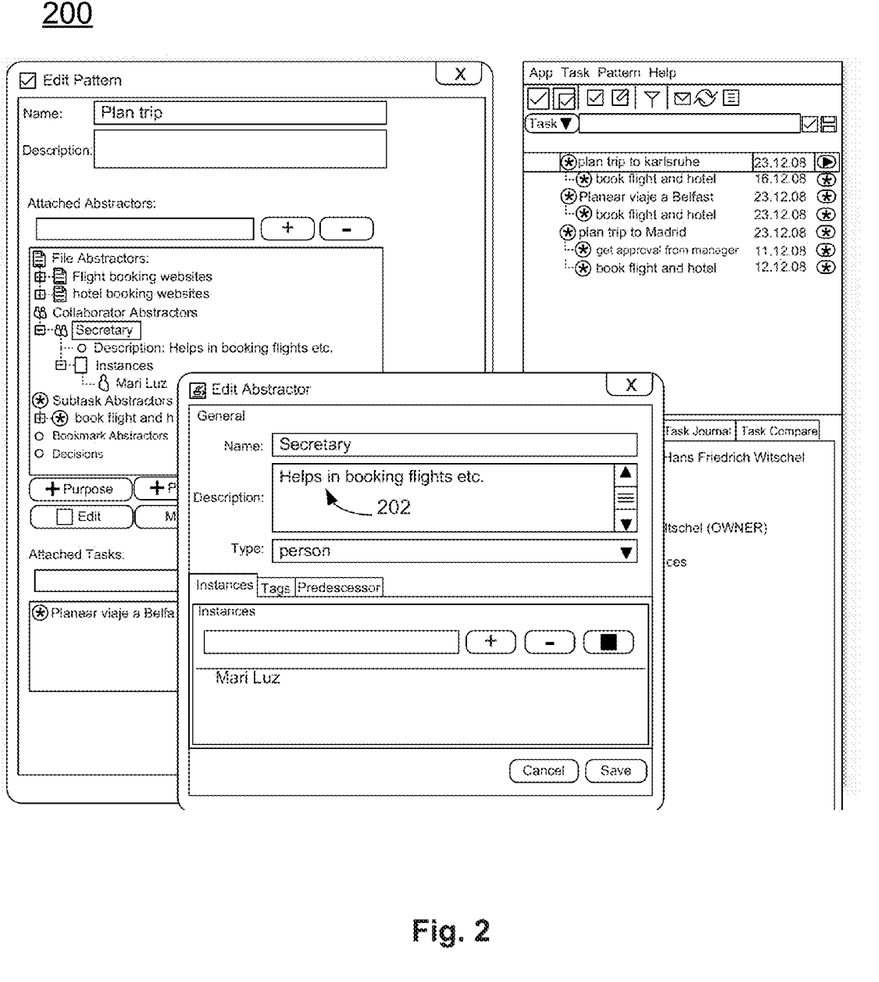
FIG. 2 shows a view of a task pattern editing environment.

In particular, FIG. 2 shows a user interface 200 wherein a task patterning software application facilitates the creation of a written description 202 in connection with a work-related task. This written description can be used to as a basis for the extraction of tags according to embodiments of the present invention.

A task pattern mainly serves as a record of work activities. It fills the gap in situations where such activities are not readily documented.

Superficially, the use of task pattern appears to introduce extra work to employees by adding a layer of formality. However, this is not necessarily the case.

In the enterprise environment, work related activities are normally prescribed by directive and regulatory guidelines, with employees implicitly and/or explicitly leaving evidence of how they accomplish a task. For example, having received a task, the typical next step is to start with looking for organizational regulations and protocols that formally specify how to proceed. Colleagues who seem to have previous experience can be consulted; contributions from the others are solicited.

Communication with other contributors occurs more often through text-based methods (e.g. e-mails, memorandums, reports, and other types of documentations) than vocal-based ones. Decision-making procedures are documented for quality control and auditing purposes. This is particularly evident in customer support units where tasks are in the form of tickets raised by users and are handled through problem-solutions and asynchronous discussions documented as part of the ticket history.

Thus below the surface, the use of task patterns or task journals already exists naturally in the everyday working environment where tasks as performed involving more than one employee. The existence of task patterns becomes more evident in examining geographically distributed organizations and customer-facing departments.

For instance, customer support widely uses ticketing systems to interact with customers and keep record for reviewing. Each of the ticket presents a instance where task pattern can be extracted.

EXAMPLE

The translation of tasks to tags may be demonstrated utilizing the support ticket system as an example. Each ticket presents a well structured task with ticket subject (as task title), short summary, and ticket description.

Keywords emerging from the content of tickets are a good source of tags. Associated with each ticket are ticket owners, contributors (appearing as email recipients, discussion participants and delegates for tasks) and other artifacts (as web pages, documents, and other tickets) that are referred to when the current ticket is being tackled. Management of these associated resources can benefit from being explicitly annotated with the tags derived from the ticket/task.

During the process of handling a system ticket, support staff tend to proceed as follows. First, they accept the ticket and assume the ticket ownership. Next, they go through the content of the ticket and recall if similar tickets were encountered previously. They may redirect/delegate the ticket to some one that is more suitable to handle the problem presented in the ticket.

If the ticket owners decide to proceed, they browse internal and public resource repository for possible references. They attach the email reply with a link to the selected material if it is in public domain or a case note if it is an internal document. After email exchange(s), they either mark the ticket as solved or request the customers to take further actions.

Embodiments of the present invention may naturally embed the tagging process in employees' normal work routine, so as to be as less obstructive as possible. For simplicity, some embodiments according to the present invention may build upon an implemented task-pattern management system, one of example of which is the Kasimir user interface. The Kasimir user interface is described in http://nepomuk.semanticdesktop.org, which is incorporated by reference for all purposes. Kasimir automatically records actions performed when carrying out a task.

While this embodiment is described in connection with Kasimir, the present invention is not so limited, and task-centric tagging can be applied to extend any systems that record the use of resources, communication, and delegation/collaboration when performing tasks, e.g. the aforementioned ticketing systems.

Often, parts of a task may be redirected to colleagues or business partners. This is done as task delegating.

When delegating a task or part of a task (T) to another colleague (P), an association is essentially established between the colleague and T. This implies that the task owner trust this colleague as an expert on whatever problems presented in T.

If P successfully performed T, tags extracted from T then capture the expertise or experiences that P may acquire through participating in T. Values such as accumulated overtime and relative frequency of tag occurrence, indicates the strong and weak points of an employee's competence.

It also possible to feed this information into enterprise expert finders. Such an enterprise expert finder can match task descriptions against profiles of employees, so as to suggest candidates for collaboration and team building.

Artifacts may be referenced as follows. When trying to complete a task, support staff tend to cite links to other useful (internal or external) resources as evidence to support observations or solutions. This task-resource relation furnishes a new approach to establishing collaborative understanding of enterprise artifacts.

By connecting artifacts to a task (T), one explicitly annotates the artifacts with tags extracted from T. Again, after a certain period of productive use, by studying the tags, real semantics of these artifacts gradually emerge.

The emergent semantics demonstrate how individuals see the artifacts in practice. It might differ from what are suggested by the titles of the artifacts, and even different from the intended semantics of their original creators.

Represented as a vector of tags, we can leverage the emergent semantics of enterprise artifacts in resource recommendation and resource management. For instance, similarity between artifacts can be computed based on the tag vectors using popular measures such as cosine similarity, Manhattan distance, ontology based similarity, string based similarity, or geometric distance.

Tag/Keyword extraction may occur as follows. Tags used in the above process can be acquired either manually or automatically.

Thus far, manual tagging is widely used in and has become a signature of many social network websites, e.g. Flickr, Delicious, and CiteULike. It rapidly gained popularity due to the Web 2.0 phenomenon. The outcome of such an activity, known as folksonomies, presents a low overhead and low maintenance cognitive consensus of the "crowds".

Recently, efforts have been made to bring collaborative manual tagging into the enterprise environment so as to help in enterprise resource/content management. An example is described by Ajita John and Doree Seligmann in "Collaborative tagging and expertise in the enterprise", Proceedings of Collaborative Web Tagging Workshop held in Conjunction with WWW 2006 (2006), which is incorporated by reference in its entirety herein.

Here, certain embodiments of the present invention may avoid manual tagging and leverage the more conventional automatic keyword extraction methods to minimize subjective biases. Keywords extracted from task contents are considered equivalent to tags, and these two terms are used interchangeably herein.

Automatic keyword extraction emphasizes an operable and systematic determination of words that are the most important ones in a document. It taps in linguistic, statistic, data mining, and semantic web technologies, to boil down documents into a set of most representative words.

The following discussion focuses upon single document keyword extraction. This is due to both theoretical and practical considerations.

On one hand, employees' expertise and experience change along with individual tasks that they accomplish. Keyword extraction based on multiple documents may not faithfully reflect such subtle fluctuation only visible to individual tasks.

On the other hand, periodically updating keywords across a large corpora of tasks might be difficult in enterprise environment due to data safety and privacy concerns. For instance, contractual materials might have to be eliminated physically and electronically when partnership ceases to continue. Operational documents might be taken offline when they become obsolete. Access privileges to certain customer data might be revoked after one finishes dealing with the customer. All these may interfere with drawing keywords from a large number of tasks, even though multi-document extraction outperforms methods based on single document.

After evaluating several keyword extraction algorithms on task data, the algorithm from the following reference was adopted: Yutaka Matsuo and Mitsuru Ishizuka, "Keyword extraction from a single document using word co-occurrence statistical information", International Journal on Artificial Intelligence Tools, 13:2004 (2003), which is incorporated by reference in its entirety herein for all purposes.

In this approach, one detects the significance of a term T with respect to a document D, based on whether or not the co-occurrence probability of T and the N most frequent terms $N_T$ agrees with the baseline probability distribution of $N_T$. If the divergence is significant enough, T is added to the initial tag/keyword set comprising the terms in $N_T$.

In the Matsuo and Ishizuka paper, the text content subject to keyword extraction includes task title, subtitle, summary if applicable and task body (e.g. problem/solution descriptions, discussion threads). However, embodiments of the invention do not crawl along embedded links to other resources that are referred to in task descriptions.

Figure 3:
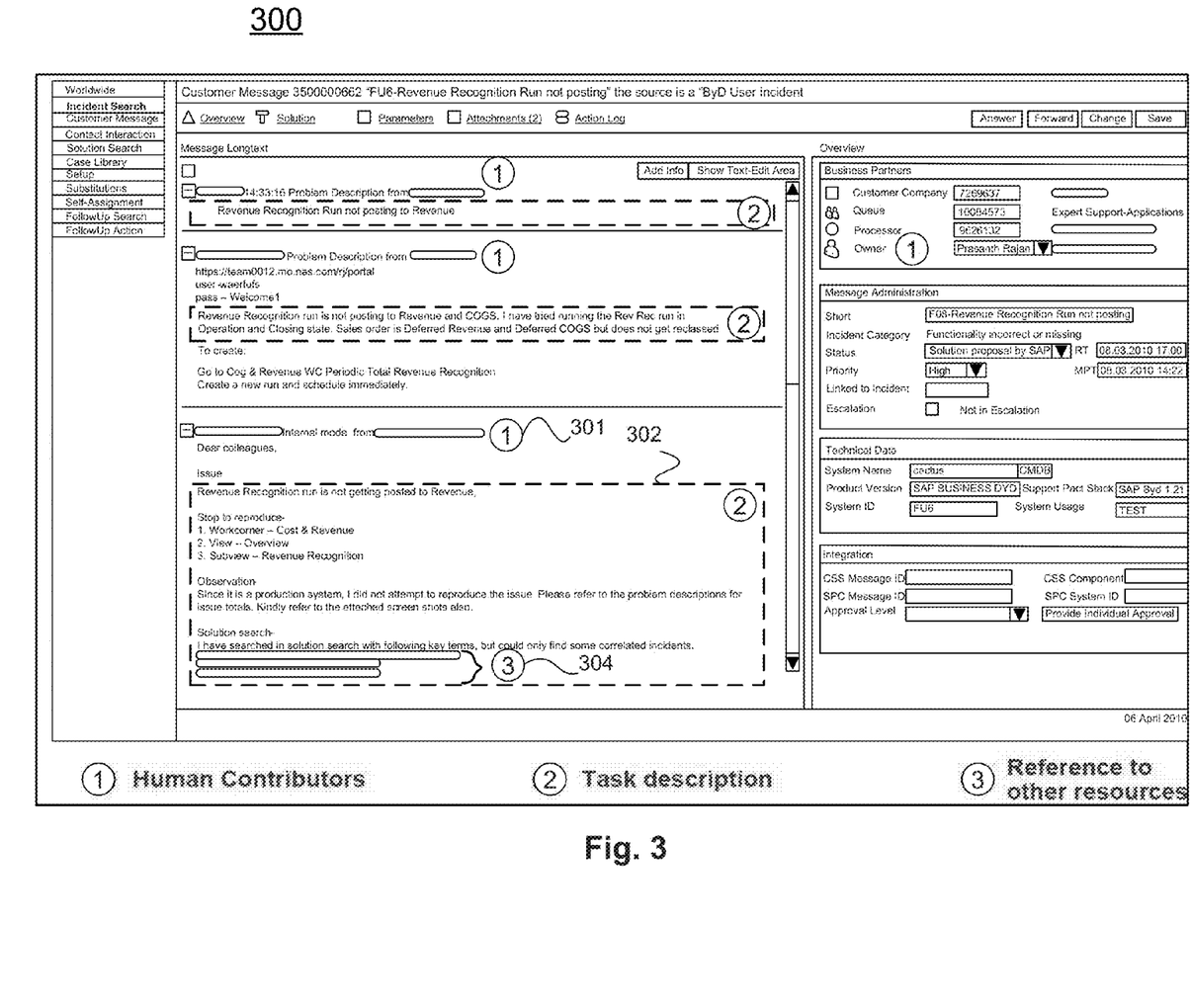
FIG. 3 shows a view of a support ticket including patternable tasks.

Text for keyword/tag extraction can be preprocessed with natural language processing methods, such as stemming, stop-word removal, etc. For instance, FIG. 3 shows a task ticket 300 from which tags may be extracted. This task ticket includes an identification 301 of a human contributor, marked with a circled number one.

In FIG. 3, the text content 302 of the ticket is highlighted with dashed rectangle and marked with a circled number two. This text content also includes a reference 304 to other enterprise resources, indicated with a circled number three. Applying the keyword extraction algorithm to this example will result in generation of the following tags: "revenue", "recognition", "COGS", "cost", "workcenter".

Task titles and descriptions are rarely subject to formal review and proof-reading. Therefore, synonyms, acronyms, and even typos abound, depending on the habit of individual task issuers/handlers. For instance, one issuer might consistently use "service-oriented architecture", while another prefers the shorthand version "SOA". A third user may employ a combination of both terms.

Thus, the resultant corpus of tags can become noisy after an extensive period of productive use. Housekeeping of tags, therefore, may be useful. Accordingly, certain embodiments of the present invention may perform tag clustering to facilitate their use, by reducing the size of tag corpus.

Tag (term) clustering is a well researched area. It finds a basis in Information Retrieval (IR) and applications in life science, multimedia, etc. Examples are described by A. K. Jain, M. N. Murry, and P. J. Flynn, "Data Clustering: A Review", ACM Computing Surveys, Vol. 31, No. 3 (September 1999), and by Todd E. Scheetz, Nishank Trivedi, Kevin T. Pedretti, Terry A. Braun, and Thomas L. Casavant, "Gene transcript clustering: a comparison of parallel approaches", Future Gener. Comput. Syst., 21(5):731-735 (2005), both of which are incorporated by reference in their entireties herein for all purposes.

In order to achieve the best results, certain embodiments of the present invention may adopt the bisecting k-means algorithm. This algorithm has been demonstrated to outperform other popular clustering algorithms. This is described by Michael Steinbach, George Karypis, and Vipin Kumar in "A comparison of document clustering techniques", Technical report (2000), #00-034 available at http://www.cs.umn.edu/tech reports, which is incorporated by reference in its entirety herein.

As explained in that document, bisecting k-means is a simple and efficient variant of the basic k-means algorithm. It starts with repetitively splitting an arbitrary cluster into two using the basic k-means algorithm. The split with the highest in-cluster overall similarity is accepted, marking the end of one loop. The desired number of clusters is achieved by further splitting the clustering with the same bisecting approach.

In applying the k-means algorithm, some embodiments of the present invention may compute the dissimilarity between two keywords/tags with the symmetrized and smoothed version of Kullback-Leibler divergence. The dissimilarity of two keywords/tags, x and y, is the divergence of the co-occurrence probabilities of x and y with respect to all the other tags extracted from the tasks that were performed by an employee:

$$dissim_{js}(x, y) = \frac{1}{2}\left(\sum_i p_{\langle x,t_i\rangle}\log\frac{p_{\langle x,t_i\rangle}}{M} + \sum_i p_{\langle y,t_i\rangle}\log\frac{p_{\langle y,t_i\rangle}}{M}\right) \quad (1)$$

$$M = \frac{1}{2}(p_{\langle x,t_i\rangle} + p_{\langle y,t_i\rangle}) \quad (2)$$

where $p_{\langle x,t_i\rangle}$ is the probability of co-occurrence of tags x and $t_i$.

An underlying rationale of this dissimilarity measure is that tags whose co-occurrences with others are highly agreed with each other are likely to be semantically associated. For instance, "SOA" tends to appear together with e.g. "SOAP", "rest(ful)", "web service", etc. where the frequency of co-occurrence agrees with those of the phrase "service oriented architecture".

In practice, the clustering algorithm may be reinforced with simple heuristics drawn from public domain, e.g. Wikipedia English Version2. Testing of the clustering algorithm with 150 keywords yielded the following preliminary results.

The algorithm is able to identify alternative names (e.g. "colgate" versus "colgate-palmolive"). The algorithm is also able to identify frequently used acronyms (e.g. "CC" versus "Credit Card" and "PwC" versus "PriceWaterhouseCoopers").

Human supervision may not be entirely excluded. For example, recommended clusters may be validated and verified by domain experts.

In addition, the algorithm relies on a major assumption that different contributors may consistently largely use the same variants within a task. Failing to meet the prerequisite can render the clustering approach less useful. Evaluating with large test data sets may also be important.

Task-based profiling and competency tagging according to embodiments of the present invention may possess a dynamic feature. In certain embodiments, tags may be ranked as follows.

Individuals take up new tasks and acquire new expertise from performing the tasks. In the meantime, the skills gained from out-dated tasks become less proficient and even obsolete.

Therefore in certain embodiments the corpus of tags indicating employee competence, may evolve based on their recentness, so as to give a higher weight to recent and more up-to-date tags then historical ones. After taking into account the time dimension, certain embodiments adopt the exponential decay factor and define the final tag weight as the sum of tag occurrence adjusted against time according to Eq. (3):

$$\omega(\alpha) = \sum_{T \in \tau} e^{-\lambda(t_0 - t_T)} \cdot Occ_T(\alpha) \quad (3)$$

where $\lambda$ is for tuning the weight against particular applications; $t_0$ represents the current time; $t_T$ is the time when the task T is performed; $\tau$ is the set of tasks performed by an employee; and $Occ_T(\alpha)$ is the occurrence of tag a that is drawn from T.

Note that $\lambda$ value should be adjusted according to the specific need of applications. In a majority of the cases, it is assumed that $\lambda=1$.

Figure 4:
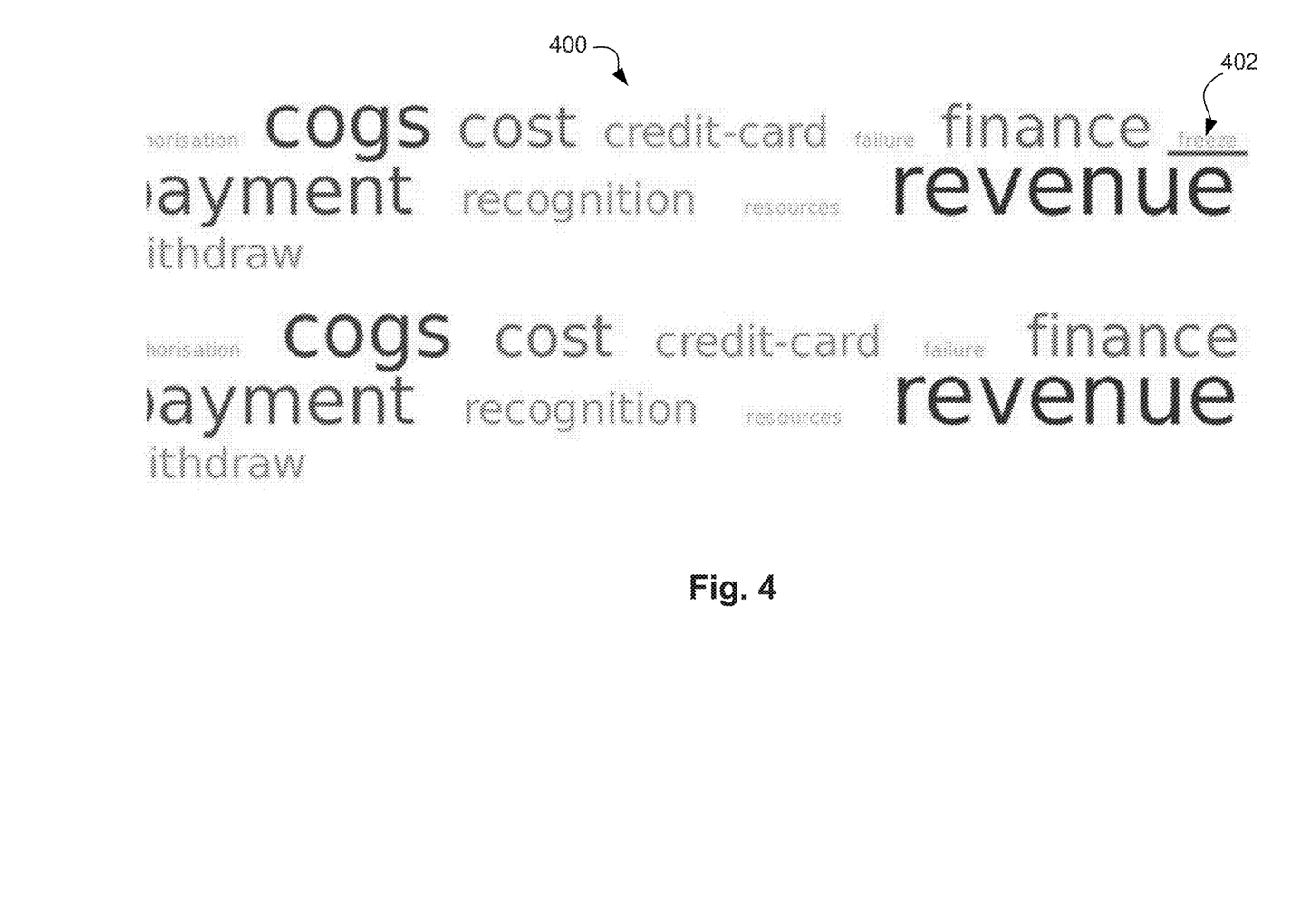
FIG. 4 shows the evolution of a tag cloud according to an embodiment of the present invention.

FIG. 4 shows a tag cloud 400 evolving along time. In particular, the monitor "freeze" 402 that has been drawn from an old ticket/task, gradually disappears as time passes. The weights of other tags may be enhanced over time, as denoted by changing indicia such as their font size or font color.

Embodiments of the present invention also allow management of the enterprise resource using tags. Enterprise IR becomes a prevalent challenge with rapidly falling storage and digitizing cost, leading to large volumes of enterprise information artifacts being available in electronic form.

Searching into the enterprise information repositories may be inherently different from general web search and web IR. Accordingly, such searching may call for well tuned, unique solutions. Examples of such solutions are described by Lars Ahrenberg in "Term extraction: A Review, Draft Version 091221", Linkoping University, Department of Computer and Information Science, and by David Hawking in "Challenges in enterprise search", ADC '04: Proceedings of the 15th Australasian database conference, pp. 15-24, Australian Computer Society, Inc. (2004), both of which are incorporated by reference herein for all purposes.

Instances of differences between general searching and searching enterprise information, are demonstrated in the following aspects. First, effective enterprise search algorithms may often rely upon thorough indexing mechanisms. The non-transparent and proprietary nature of enterprise information, however, deteriorates the performance of many machine learning and data mining algorithms that show excellent results on indexing the "open" World Wide Web.

Second, enterprise information artifacts are heterogeneous in format. Effective IR methods should operate on a unified indexing scheme over a wide variety of enterprise resources such as artifacts, people, divisions, and geographic regions.

A third aspect is that enterprise IR should accommodate queries composed using local business languages. Bound tightly with the corporate culture, each company to some extent exercises a business dialect which may not be "understandable" to general IR methods.

Indexing enterprise information resources is tantamount to assigning metadata to such resources. When assigning metadata to enterprise resources, there is always a risk of misalignment. One example is misalignment between the intension (semantics) of the resources and how people use them in practice. Another example is misalignment between the context where the resources are annotated and the context where the resources are consumed. Still another example is misalignment between metadata annotation tools and one's everyday working environment. Embodiments of the invention can address/alleviate such misalignment, and situate enterprise resources annotation in everyday work.

A task-based tagging approach according to embodiments of the present invention can aid in enterprise resource management, with a work specific indexing mechanism.

According to certain embodiments, the tag-based schema can be utilized to identify experts. The expertise of employees can be effectively captured with a set of task-based tags. When trying to locate the most appropriate expert for a problem at hand, one can then rank all the employees based on how good they can take on the job.

If both the employees' competence tags and the problem descriptors are considered as vectors in a high dimensional space, the appropriateness of an employee against a given problem can be computed according to Equation (4):

$$sim(p, e) = \frac{\sum_i w_{p_i} \times w_{e_i}}{\sqrt{\sum_i w_{p_i}^2} \sqrt{\sum_i w_{e_i}^2}} \quad (4)$$

where $w_{p_i}$ and $w_{e_i}$ are the weights of keywords/tags in the problem description and employees' competence tags respectively.

Enterprise expert finding systems can then utilize this competency tagging approach with other graphic user interface features. For instance, the system can automatically recommend the top ten best matching candidates for users to evaluate and decide.

Task-based tagging can be applied to the management of other types of enterprise resources. According to certain embodiments, the tag-based schema can be utilized to provide a system for recommending resources.

Similar to expert finder, tags associated with artifacts such as documents, web pages, etc., facilitate automatic resource recommendation based on a distance measure as discussed above. That is, among all the possible candidates, the system according to embodiments of the present invention may find the best match, and suggest same to users together with (dis) similarity. An advantage of this recommendation is that it is situated with work context, and interprets similarity of artifacts independent of their face value.

If the concept of "artifacts" is extended to tasks and processes, the recommendation system can be based on similarity computed as follows:

a task comprises sub-tasks, and is associated with artifacts and human resource.

This naturally becomes a labeled and directed graph, G=(V,E) with nodes V corresponding to (sub-)tasks and individual artifacts, and edges E corresponding to either part-whole relationships or resource associations.

The easy conversion of task graphs inspires us to consider graph similarity measures. Graph similarity has been studied, for example by L. Lovasz and M. Plummer in "Matching Theory", North-Holland, Amsterdam (1986), which is incorporated by reference herein for all purposes.

A task graph is essentially a tree. The root of a task tree is the task itself. Children of the root are the first level sub-tasks, which in turn have their sub-tasks as child nodes. The leaves of a task-tree are artifacts supporting the fulfillment of the task.

A piece of an artifact may be duplicated when it is referred to by more than one sub-task. Focusing on task trees allows how a subtask node is labeled, to be largely ignored.

When two sub-tasks are supported by the same set of evidence, similarity of leaves is computed as above. It can be understood, based on the closed world assumption, they have overlapping instance data and use the same knowledge to proceed.

This leads to a further assumption that subtask using the same knowledge, can be considered as similar ones even though they are labeled differently. The closed world assumption is supported by two observations in enterprise environment.

First, the supporting evidence is shared and frequently used by a large number of employees. Thus, a common understanding of tags can be easily negotiated and reinforced.

Second, such a set of artifacts is relatively stable. The creation or introduction of new information artifacts in a mature organization, is constrained by protocols and regulations. Hence information artifacts that are not present, are considered to be excluded from the organizational knowledge space and from the similarity computation.

According to certain embodiments, the algorithm can be formalized as:

$$sim(\tau, \tau') = \frac{|\gamma(\tau) \cap \gamma(\tau')|}{|\gamma(\tau) \cup \gamma(\tau')|} \quad (5)$$

where $\gamma(x)$ gives the set of supporting artifacts of x, and $\tau$ and $\tau'$ are two bottom-level subtasks.

For pairs of inner nodes from different task trees (T and T'), the similarity is computed from those of their children using tree edit distance. This is described by J. Wang, K. Zhang, K. Jeong, and D. Shasha in "A system for approximate tree matching", IEEE Transactions on Knowledge Data Engineering, 6(4):559-571 (1994), which is incorporated by reference in its entirety for all purposes.

Tree edit distance is an approximate measure computing the difference of two trees as a numeric value between 0 and 1. Based on the TreeDiff algorithm, task tree edit distance is defined as the minimum number of node deletes and inserts when one task tree is transformed into another.

$$\text{sim}(T,T')=1-\text{diff}(T,T')$$

$$\text{diff}(T,T')=\min\{\epsilon(S)|S \text{ is a sequence of edit operations } T \to T'\}$$

where $\epsilon(\cdot)$ is the cost function mapping an edit operation to a numeric value based on users' preference. The initial alignment among nodes, stems from the similarity among bottom-level subtask nodes computed as above.

Figure 5:
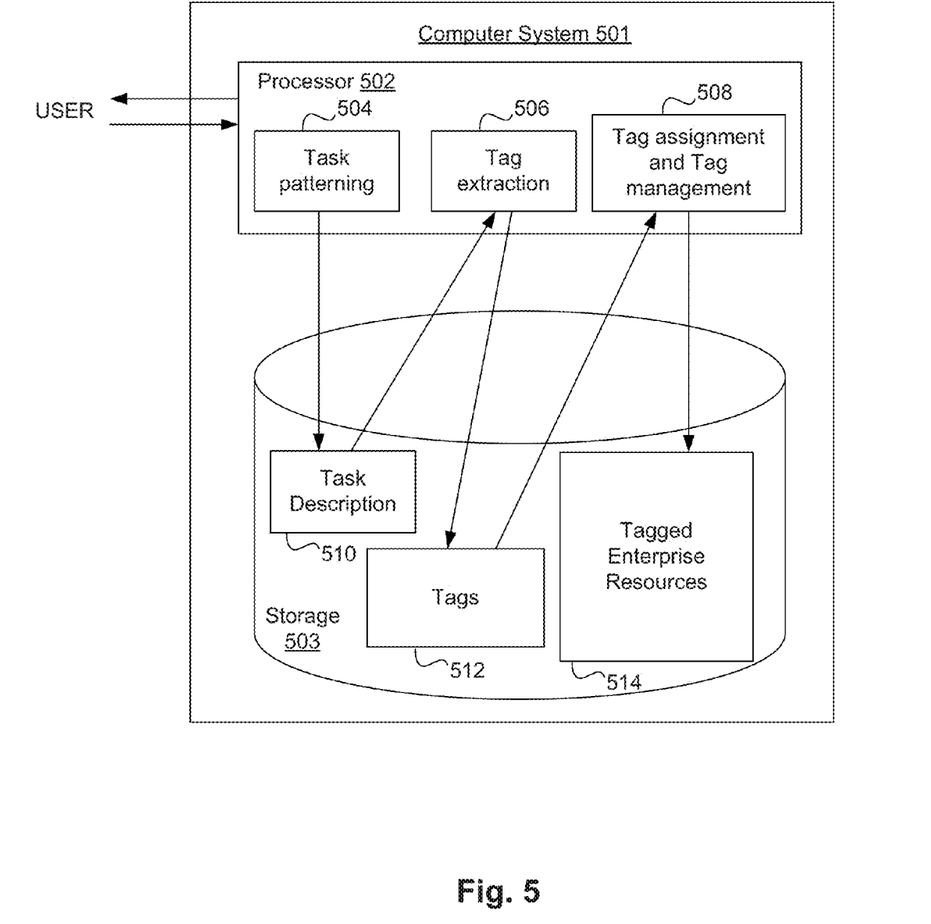
FIG. 5 shows a computer system for use in a task-based enterprise tagging scheme according to one embodiment.

FIG. 5 illustrates hardware of a special purpose computing machine configured to implement a tagging scheme according to an embodiment of the present invention. In particular, computer system 501 comprises a processor 502 that is in electronic communication with a computer-readable storage medium 503 (e.g. a non-transitory computer readable storage medium) that can comprise code for performing certain aspects of embodiments of the present invention.

For example, the processor may include a task patterning module 504 that is configured to generate a task description 510 that is stored. A tag extraction module 506 may reference the task description and generate a tag 512 that is stored. A module 508 configured to perform tag assignment and tag management, may reference the stored tag and then store the tagged enterprise resources 514.

The computer system may comprise a software server. A number of software servers together may form a cluster, or logical network of computer systems programmed with software programs that communicate with each other and work together to process requests.

Figure 6:
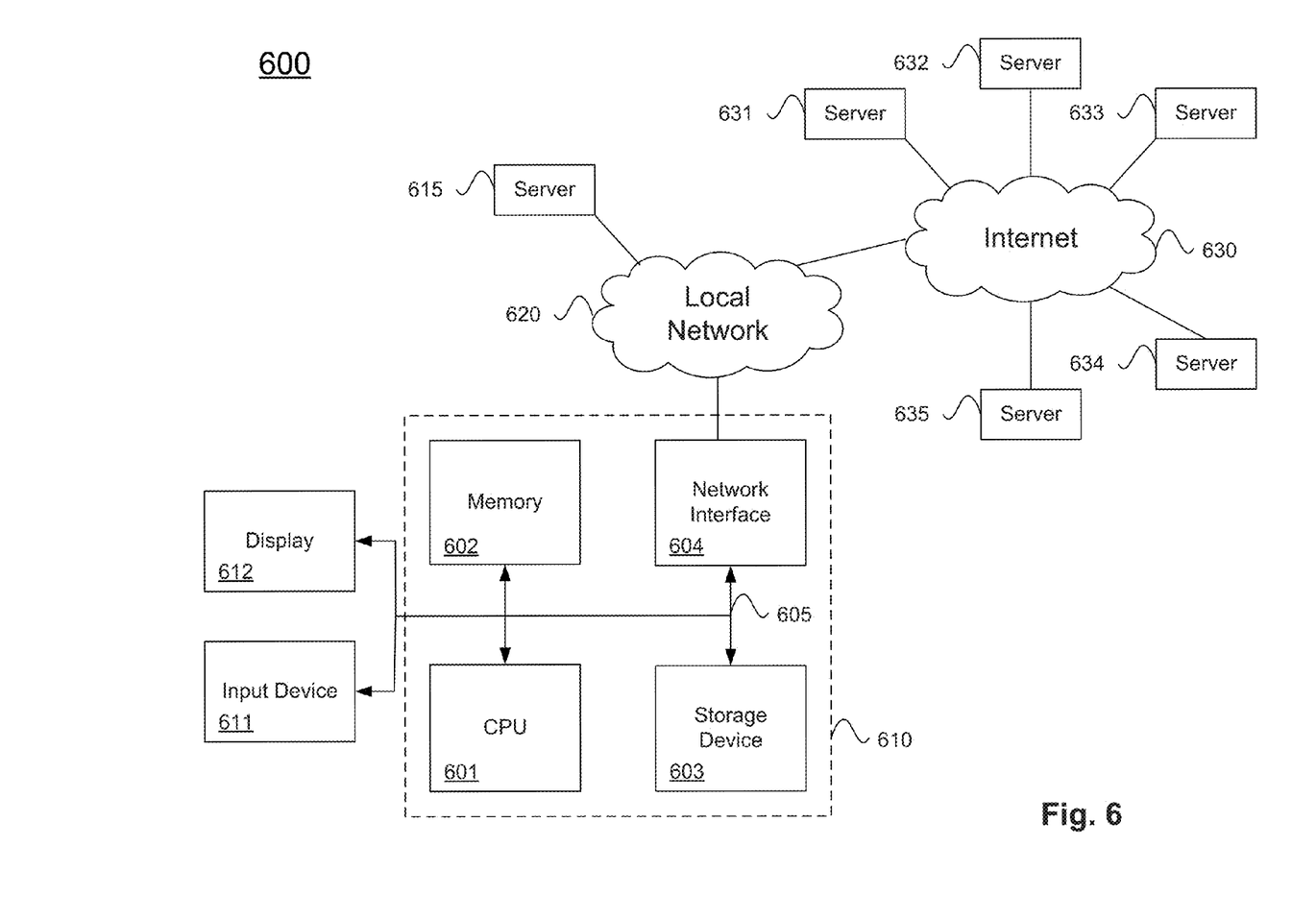
FIG. 6 illustrates hardware of a special purpose computing machine configured with a task-based enterprise tagging scheme according to one embodiment of the present invention.

An example computer system 610 is illustrated in FIG. 6. Computer system 610 includes a bus 605 or other communication mechanism for communicating information, and a processor 601 coupled with bus 605 for processing information.

Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both.

A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of non-transitory computer readable storage media.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein.

In an example involving the Internet, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Tag-based schemes according to embodiments of the present invention may offer a number of possible benefits. One such benefit is to motivate employees.

As discussed in the previous sections, one of the major barriers to successfully deploying and exploiting a tagging system in the enterprise environment can be the lack of incentive. The past few years have witnessed the rise and fall of so-called enterprise 2.0 platforms. Initial excitement faded when the attention from management has been diverted to other more urgent businesses, and when "try-out" has become work routine. Unless such tools becomes an integral part of one's daily working environment, it is not likely to maintain the same level of enthusiasm in the long term.

Embodiments of the present invention address this by automating the tagging process and making it integrate within employees' everyday work. First, tagging is automatically done as part of one's work.

The motivation of creating and maintaining tags is then driven by the motivation of accomplishing one's work. For the latter, the motivation is naturally assured in companies.

Second, the accuracy of tags is assured. The desire of performing work tasks with good quality leads to accurate and precise links between task and support documents as well as colleagues as human experts that one leveraged to complete the tasks. Misconduct, spam, and other inappropriate behavior widely witnessed in general social network websites, therefore, is less likely to appear in this task-based situations.

After a period of productive use, further benefits may emerge. These include but are not limited to the following application scenarios.

Aligning employees' expertise with their work: misaligned expertise and work requirements is one of the reasons that lower the performance of employees. Many organizations exercise and encourage people to evaluate themselves through self-labeling. When tags accumulated with the task-based approach is deviated too much from his/her self-evaluation, it suggests that some changes have to be made, either transferring the employee to another unit/department or providing corresponding training.

Aligning employees' expertise with organizational strategies: tagging approaches according to embodiments of the present invention may be closely related to the actual business of a company (i.e. the daily activity of the employees). The tendency can be clearly visualized (e.g. with tag cloud). The management can then easily discover whether the actually daily activities deviate from the company's core business and whether the company should be reorganized to gain efficiency. For instance, if the general clergy staff has to handle a large number of trip booking tasks, it might suggest that a dedicated travel manager should be appointed to acquire and improve the corresponding expertise.

Housekeeping enterprise resources: it might be the case that some enterprise resources have been associated with apparently irrelevant or mismatching tasks. This can result from the resources either being wrongly interpreted, or the resources are given a wrong description. In both cases, some housekeeping is necessary. On the other hand, if different resources are constantly appear in similar contexts, it suggests the existence of duplication. Of course some duplication might be due to operational needs, highlighting it can draw people's attention for further investigation. Finally, if certain physical or human resources are seldom referred to in employees' every tasks, redundancy to some extent is suggested. It is therefore beneficial to re-align the workforce or the organizational knowledge repository, in terms of documents, regulations, and protocols, to reflect the actually business of a company.

In conclusion, tagging as the signature of Web 2.0 era, has been introduced to enterprise content management and enterprise search. Embodiments of the present invention relate to methods and systems which embed enterprise tagging into the everyday working environment. This is achieved by utilizing the textual description of tasks that have been successfully carried out by an employee. Keywords extracted from such task descriptions recapitulate an employee's past experience and thus the expertise that he/she may/can acquire through accomplishing the tasks.

Intuitively, this tagging approach alleviates the issues intrinsic to manual tagging approaches, for example a lack of incentive, subjective under/overstatement, mismatch of granularity levels, and difficulty of maintenance. Embodiments may be used to enhance current enterprise content management as well as competency management capacities, for example collaborative people tagging, and automatic expert profiling. Embodiments of the present invention can complement existing approaches to achieve a more accurate alignment with one's everyday work-related activities.

The above description illustrates various embodiments of the present invention along with examples of how aspects of the present invention may be implemented. The above examples and embodiments should not be deemed to be the only embodiments, and are presented to illustrate the flexibility and advantages of the present invention.

For example, keyword manipulation algorithms proposed in the paper are just exemplary implementations, and others are possible. Alternative approaches to the optimization of keyword management may be used. For instance, a domain ontology can be leveraged to give guidance to the keyword extraction. A domain ontology can also assist in an ontology-based keyword classification.

Embodiments of the present invention are based in part upon ready documentation of work related activities in well-established organizations. The digital generation entering the workforce, however, is giving rise to an increasing phenomenon of informality at work, with flattened organizational structure, home officing, and ad-hoc task workflow becoming common.

This presents both challenges and opportunities. On the one hand, work-based competency management is more important then ever before to ensure a healthy growth of companies. On the other hand, the assumptions enjoyed working with "traditional" companies may not be applicable in more dynamic ones. Evaluation with both types of organizations may be necessary.

From a more technical perspective, integrating seamlessly with enterprise information platform is useful. Accordingly, schemes according to embodiments of the present invention may be extended to interface with proprietary information systems.

Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving a written description that at least specifies actions comprising a job task;
performing text analysis and term extraction on the written description to produce extracted tags;
refining the extracted tags by clustering to produce refined tags;
describing an enterprise resource using the refined tags;
storing the refined tags associated with the enterprise resource in a data store of tagged enterprise resources; and
managing resources in the enterprise for a task to be performed in the enterprise, including specifying one or more refined tags stored in the data store of tagged enterprise resources to identify the resources.

2. The method of claim 1 wherein the written description refers to the enterprise resource.

3. The method of claim 2 further comprising storing the refined tags associated with the job task.

4. The method of claim 2 wherein the enterprise resource comprises a human being.

5. The method of claim 2 wherein the enterprise resource comprises a non-human resource.

6. The method of claim 1 further comprising preprocessing the written description with natural language processing methods prior to the extracting.

7. The method of claim 1 wherein the written description is linked to the job task through task patterning.

8. The method of claim 1 wherein the performing further includes one or more of:
analyzing resources of the enterprise using the refined tags; and
a recommendation of resources of the enterprise using the refined tags for a task to be performed in the enterprise.

9. A non-transitory computer readable storage medium embodying a computer program for performing a method, said method comprising:
receiving a written description that at least specifies actions comprising a job task;
performing text analysis and term extraction on the written description to produce extracted tags;
refining the extracted tags by clustering to produce refined tags;

describing an enterprise resource involved in the job task using the refined tags;

storing the refined tags associated with the enterprise resource in a data store of tagged enterprise resources; and managing resources in the enterprise for a task to be performed in the enterprise, including specifying one or more refined tags stored in the data store of tagged enterprise resources to identify the resources.

10. The non-transitory computer readable storage medium of claim 9 wherein the written description refers to the enterprise resource.

11. The non-transitory computer readable storage medium of claim 10 wherein the method further comprises storing the refined tags associated with the job task.

12. The non-transitory computer readable storage medium of claim 10 wherein the enterprise resource comprises a human being.

13. The non-transitory computer readable storage medium of claim 10 wherein the enterprise resource comprises a non-human resource.

14. The non-transitory computer readable storage medium of claim 9 wherein the method further comprises preprocessing the written description with natural language processing methods prior to the extracting.

15. A computer system comprising:
one or more processors;
a software program, executable on said computer system, the software program configured to:
receive a written description that at least specifies actions comprising to a job task;
perform text analysis and term extraction on the written description to produce extracted tags;
refine the extracted tags by clustering to produce refined tags;
describe an enterprise resource involved in the job task using the refined tags;
store the refined tags associated with the enterprise resource in a data store of tagged enterprise resources; and
managing resources in the enterprise for a task to be performed in the enterprise, including specifying one or more refined tags stored in the data store of tagged enterprise resources to identify the resources.

16. The computer system of claim 15 wherein the written description refers to the enterprise resource.

17. The computer system of claim 16 wherein the method further comprises storing the refined tags associated with the job task.

18. The computer system of claim 16 wherein the enterprise resource comprises a human being or a non-human resource.

19. The computer system of claim 15 wherein the method further comprises preprocessing the written description with natural language processing methods prior to the extracting.

20. The computer system of claim 15 wherein the written description is linked to the job task through task patterning.

* * * * *